United States Patent [19]
Campbell et al.

[11] Patent Number: 5,530,548
[45] Date of Patent: Jun. 25, 1996

[54] CALIBRATABLE OPTICAL DISTANCE SENSING SYSTEM AND METHOD

[75] Inventors: James A. Campbell, Ann Arbor; Edward J. Gillis, South Lyon, both of Mich.

[73] Assignee: Automotive Systems Laboratory, Inc., Farmington Hills, Mich.

[21] Appl. No.: 335,531

[22] Filed: Nov. 7, 1994

[51] Int. Cl.$^6$ .................................................. G01B 11/14
[52] U.S. Cl. .......................... 356/375; 356/243; 356/3.04
[58] Field of Search ................................ 356/6, 375, 376, 356/243, 3.02, 3.03, 3.04

[56] References Cited

U.S. PATENT DOCUMENTS

| | | | |
|---|---|---|---|
| 4,375,921 | 3/1983 | Morander | 356/243 |
| 4,682,894 | 7/1987 | Schmidt et al. | 356/243 |
| 4,925,308 | 5/1990 | Stern et al. | 356/243 |

Primary Examiner—F. L. Evans

[57] ABSTRACT

A calibratable optical distance measuring system (100) and method of calibrating the same utilizes a plurality of electronic calibration constants stored in memory (118) to compensate the measurement output of a position sensitive detector element (18) for variations in physical design and circuit performance parameters. The method of calibrating includes generating the plurality of electronic calibration constants by placing the optical distance measuring system (100) into a calibration fixture (200 or 208) where at least one target object is moved into known distances, and the calibration constants are determined based on the system's measurements of the known distances.

6 Claims, 2 Drawing Sheets

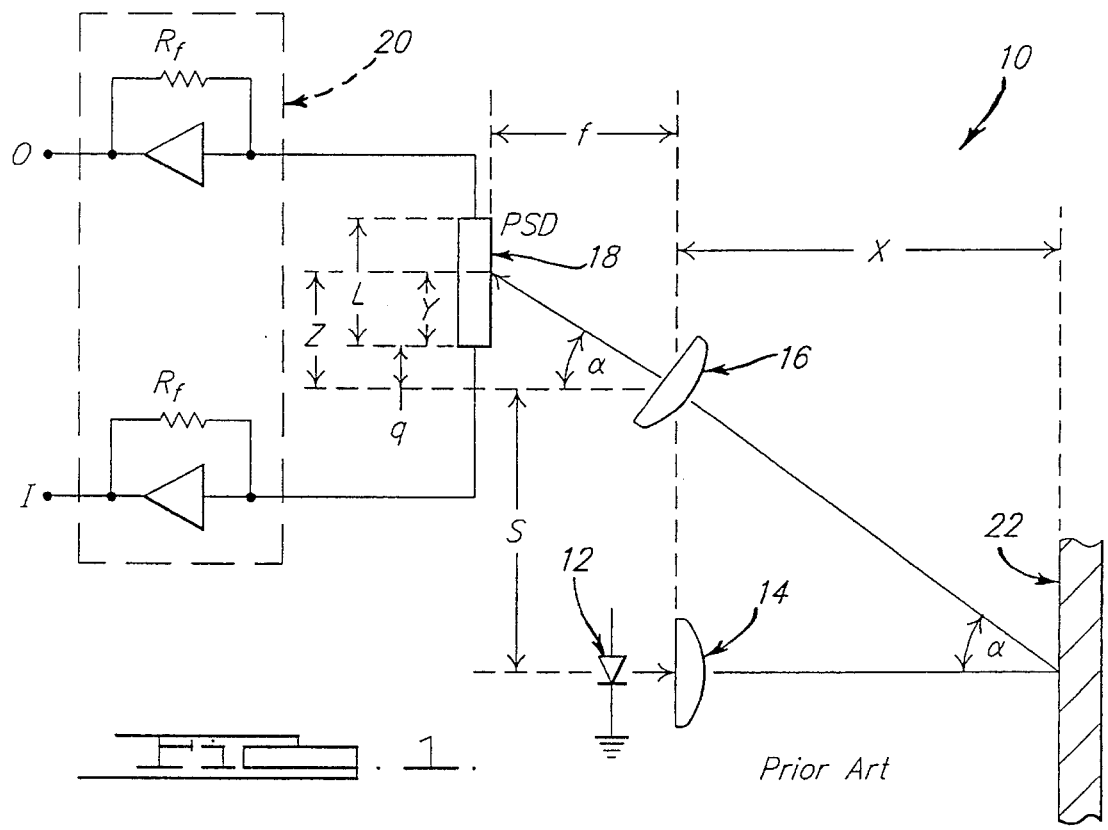
FIG. 1. *Prior Art*
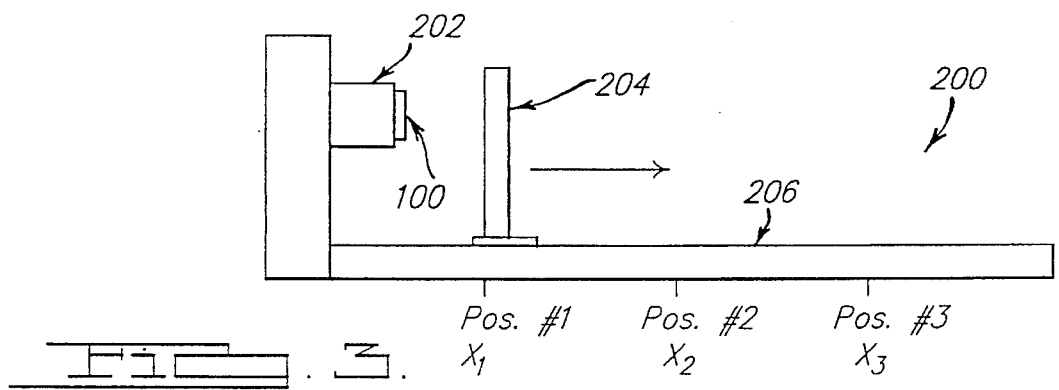
FIG. 3.
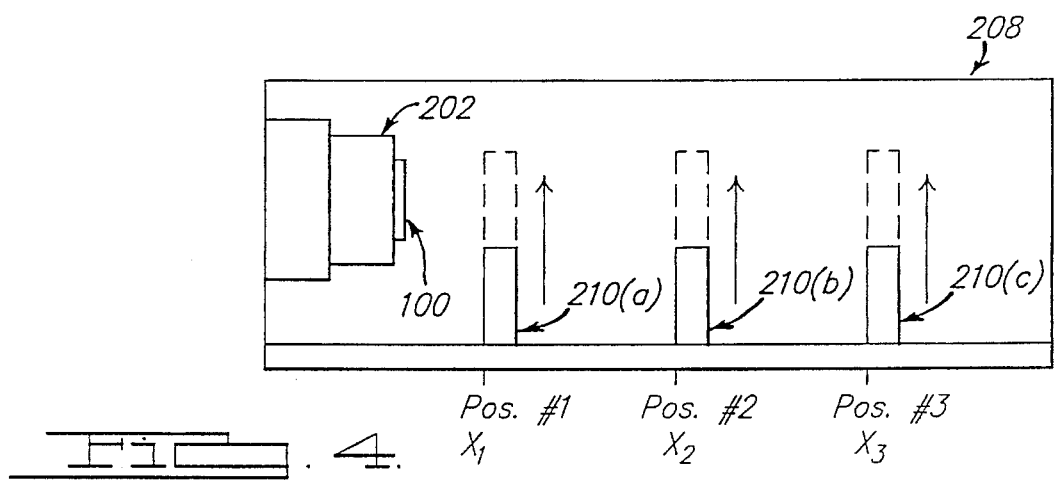
FIG. 4.

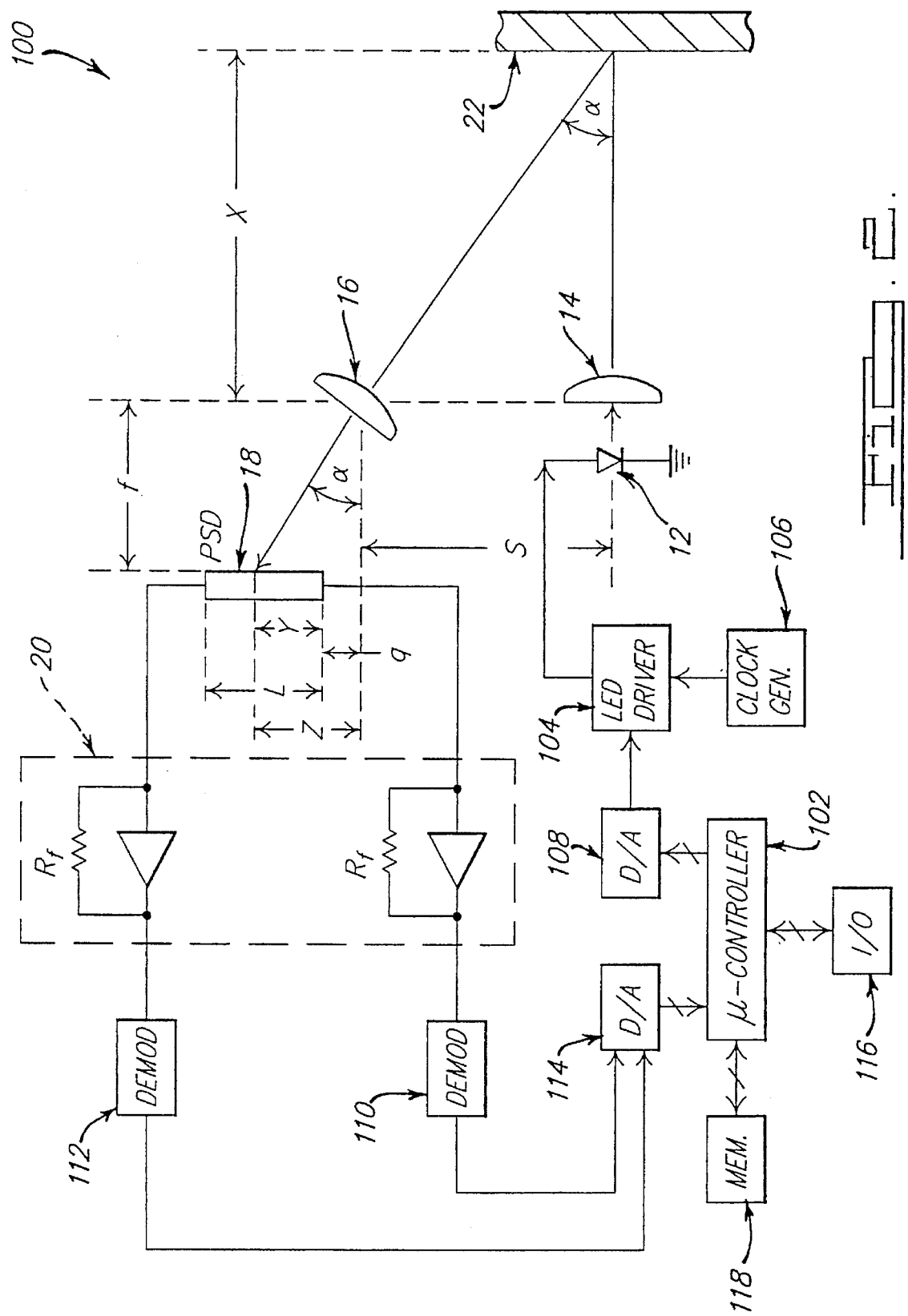

CALIBRATABLE OPTICAL DISTANCE SENSING SYSTEM AND METHOD

BACKGROUND OF THE INVENTION

The present invention relates generally to optical distance sensing arrangements, and more particularly to calibration of optical distance sensing arrangements using position sensitive detectors (PSD).

Conventional optical distance measuring systems which utilize a PSD element to measure distance between the optical system and the surface of an object, such as used in autofocus cameras and other range measuring equipment, measure distance by triangulation. More specifically, as shown in FIG. 1, a block diagram of a conventional optical distance measuring system 10 includes an LED transmitter 12, a transmitter lens 14, a receiver lens 16, and a PSD element 18 with associated amplifier circuit 20. In operation, the LED emits a distancing light beam which is reflected in all directions by the surface of an object 22. The light which is reflected through the principal point of the receiver lens 16 forms an angle α relative to the incident beam. The reflected light is focused by the receiving lens 16 to form a beam spot on an active area of the PSD element 18. The various physical parameters shown in FIG. 1 are defined as follows:

x—distance of the object from principal point of transmitter lens along beam of incident distancing light;

L—length of the active area of the PSD element;

I—current from the inside lead of the PSD element;

O—current from the outside lead of the PSD element;

y—distance from the inside edge of the PSD active area to the center of the spot of reflected/scattered light;

s—perpendicular distance from the center of the incident distancing light beam to the principal point of the receiver lens;

f—distance between the principal point of the receiver lens and the plane of the PSD as measured parallel to the incident distancing light beam;

q—distance from a point where a line through the principal point of the receiver lens and parallel to the incident distancing light beam intersects the plane of the PSD element to the inside edge of the PSD active area; and z—distance from a point where a line through the principal point of the receiver lens and parallel to the incident distancing light beam intersects the plane of the PSD element to the center of the reflected light spot on the PSD element; where $$y = LO/(I+O); \quad (1)$$

$$z = q + y; \text{ and}$$

$$\cot \alpha = x/s = f/z,$$

$$x = (f)(s)/z \quad (2)$$

As evidenced from equation (2), the distance measurement x is directly affected by the interpositioning of the PSD element, the receiver lens and the transmitter. Thus, manufacturing and/or assembly variations in f, s, and z cause large variations and errors in the distance measurement. This is particularly true the farther away the object is relative to the distance measuring system.

Generally, known optical distance measuring systems attempt to accommodate for manufacturing/assembly variations by incorporating a mechanical adjustment mechanism into the system. In this manner, detection of incorrect distance measurements due to slight variations in positioning can be corrected by adjusting the physical position of a desired system component. However, mechanical adjustments are unsatisfactory because of the substantial expense added to both the overall system and the manufacturing/assembly process therefor. In addition to measurement errors arising from physical misalignments, differences in gains between the PSD I and O amps can create measurement errors due to improper O and I current readings when calculating y. Thus, known optical distance measurement systems have not provided a satisfactory arrangement which can effectively compensate for variations in circuit component parameters and physical parameters, thereby compromising distance measurement accuracy.

SUMMARY OF THE INVENTION

It is therefore, an object of the present invention to provide an improved calibration system for use in an optical distance sensing/measuring system which compensates for variations in system design parameters.

It is, another object of the present invention to provide an improved calibration system for use in an optical distance sensing/measuring system having a PSD element which electronically compensates for variations in physical and circuit performance parameters.

It is a further object of the present invention to provide a cost effective method of calibrating an optical distance measuring system to improve measurement accuracy of the system.

It is also an object of the present invention to provide a method of calibrating an optical distance measuring system by generating a plurality of calibration constants which can be stored in a system memory.

It is also an object of the present invention to provide a method of generating a plurality of electronically storable calibration constants using a calibration fixture to provide measurements of at least three different known distances.

In accordance with a first aspect of the present invention, a calibratable optical distance measuring system comprising an optical transmitter for directing a distancing light beam at an object separated a particular distance from the transmitter, and an optical receiver comprising a means for imaging onto a sensing means the distancing light beam after scattering by the object. The sensing means generates an output which is indicative of the particular distance between the object and the transmitter. A processor means is responsive to the sensing means output for generating a system output representative of the measured distance between the object and the transmitter. The processor means comprises a memory for storing a plurality of calibration constants, wherein the processor means combines the sensing means output with the plurality of calibration constants to generate the system output.

The sensing means preferably comprises a position sensitive detector (PSD) which produces a first (I) and second (O) electrical current output responsive to a light beam being imaged onto an active sensor area. The amount of electrical current respectively output on the first and second outputs is dependent on the position of the images light beam in the active sensor area, wherein the processor uses the first and second outputs and positioned triangulation to generate the system output. The plurality of calibration constants comprise predetermined values specifically generated to compensate for variations in system physical and circuit component operational parameters.

In further accordance with the present invention, the plurality of calibration constants comprise a first (c), second (a) and third (b) constant, wherein the first constant is based on a receiver amplifier gain ratio, the second constant is based on the first constant and a first set of interpositional distances of the receiver and transmitter, and the third constant is based on a second set of interpositional distances of the receiver and transmitter. The calibration constants a, b, and c are further defined as follows:

$$a = (qc)/(fs),$$
$$b = (q+L)/(fs), \text{ and}$$
$$c = \text{(an amplifier gain from the second electrical current output)/(an amplifier gain from the first electrical current output);}$$

wherein the distance to object $(x)=(cI+O)/(aI+bO)$.

The calibration constants a, b, and c can be determined during manufacture of the system by utilizing a plurality of distance measurements for known distances, or using predetermined system design parameters.

In accordance with a second aspect of the present invention, a method for calibrating an optical distance measuring system having a means for determining the distance between an object and the system by transmitting an optical distancing light beam toward the object and measuring the light which is reflected or scattered by the object and combining the measurements with a plurality of electronically stored calibration constants, the method comprises the steps of positioning the optical distance measuring system on a calibration fixture, moving at least one target object into the system's distancing light beam path at a plurality of known distances from the system, and activating the optical/distance measuring system to measure the plurality of known distance to the target object. The plurality of calibration constants are then generated based on the measurements of the plurality of known distances, and stored into a memory located in the optical distance measuring system.

In a first arrangement, the calibration fixture comprises a rail mechanism for controlling the movement of the at least one target object, and the moving step further comprises the step of sequentially sliding the at least one target object along the rail mechanism to position the at least one target object at the plurality of known distances. In a second arrangement, the calibration fixture comprises a control means for respectively moving a different target object into the distancing light beam path at each of the plurality of known distances, and the moving step further comprises the step of sequentially activating the control means to move a particular one of the respective target objects into the distancing light beam path.

The present invention will be more fully understood upon reading the following detailed description of the preferred embodiment in conjunction with the accompanying drawings.

BRIEF DESCRIPTION OF THE DRAWINGS

FIG. 1 is a diagrammatic schematic of a conventional optical distance measuring system;

FIG. 2 is a diagrammatic schematic of an optical distance measuring system in accordance with the present invention;

FIG. 3 is a diagrammatic illustration of a calibration device and method in accordance with a first arrangement of the present invention; and FIG. 4 is a diagrammatic illustration of a calibration device and method in accordance with a second arrangement of the present invention.

DETAILED DESCRIPTION OF THE PREFERRED EMBODIMENT(S)

Referring to FIG. 2, there is shown an optical distance measuring system 100 in accordance with the present invention having the same basic transmitter, receiver and PSD components as described above in context with FIG. 1, wherein like elements have been designated with identical reference numbers. The system 100 further includes a microprocessor/controller 102, and a transmitter modulator circuit formed from an LED driver 104, clock generator 106, and a modulation input from controller 102 via a DAC convertor 108. In the preferred embodiment, the modulator circuit modulates the optical incident distancing beam at $\approx 10$ Khz in a manner well known to one having ordinary skill in the art.

The modulated IR incident distancing light beam is reflected and/or scattered by a surface of the object 22 and re-imaged by the receiver lens 16 onto the PSD element 18. The inside and outside currents produced by the PSD element 18 are respectively amplified in amp circuit 20 and synchronously demodulated by demodulator 110 and 112. As is well understood by one having ordinary skill, the synchronous demodulator include a means for recovering and synchronizing to the transmitter carrier, thereby rendering the system less susceptible to corruption from background noise. After demodulation, the I and O current outputs are converted to digital signals by a A/D convertor 114 and supplied as an input to controller 102 for calculation of the distance x. An input/output (I/O) port 116 provides connection to external control circuitry which utilizes the calculated distance in a decisional process, and/or facilitates receipt of externally generated control signals for controller 102.

In accordance with the present invention, mechanical and electrical circuit component performance variations are compensated for by calculating a set of calibration constants at the time of system 100 manufacture/assembly. The calibration constants are stored in a memory 118, such as an EEPROM, and are used by the controller 102 to calculate the distance x in accordance with the following equation:

$$x=(cI+O)/(aI+bO), \qquad (3)$$

where a, b, and c are the calibration constants.

Generation of equation (3) and the calibration constants a, b, and c is based on the following analysis. As noted above in equation (1), $y=LO/(I+O)$, where I is the current from the inside lead of the PSD, O is the current from the outside lead, and L is the length of the active area of PSD. As also noted above, the relationship of y to I and O is affected by the relative gains of the respective current amplifiers. For example, the inside and outside currents should be equal when y is L/2, i.e., half way from inside to outside. However, this will not be true if the gains of the amplifiers are different. In accordance with the present invention, the possibility of a difference in the gains for the inside and outside currents can be taken into account by multiplying I by the calibration constant c, where c is the ratio of the outside gain to the inside gain. Therefore, $$y=LO/(cI+O)$$

As further noted above in equation (2), $$x=(fs)/Z, \text{ and}$$

$$z=q+y.$$

Therefore, $$\begin{aligned} x &= (fs)/[q + LO/(cI + O)] \quad (4) \\ &= (fs)(cI + O)/[q(cI + O) + LO] \\ &= (cI + O)/[(q/fs)(cI + O) + (L/fs)O] \\ &= (cI + O)/[(qc/fs)I + ((q + L)/fs)O]. \end{aligned}$$

Thus, using equation (4) and defining the calibration constants as follows:

$$a=(qc)/(fs),$$

$$b=(q+L)/(fs), \text{ and}$$

$$c=(\text{outside amp gain})/\text{inside amp gain}),$$

x can be calculated according to equation (3) above, i.e., $$x=(cI+O)/(aI+bO).$$

Once the calibration constants are determined, the position x is calculated in terms of the measurements of I and O with three multiplications, two additions, and one division.

In accordance with the present invention, there are two methods by which the calibration constants can be determined. First, the calibration constants can simply be calculated in terms of specified physical parameters, where nominal values for the physical parameters, q, c, L, f, and s can be set, for example, as follows:

q=0 mm.; c=1; L=6 mm.; f=13.34 mm.; s=1.4 in (35.66 mm.)

Since it is desired to express the distance x away in inches, the value of s in inches is used. From the definition of the calibration constants a=(qc/fs), b=((q+L)/fs), c=c, one generates nominal constants of:

a=0; b=0.32127 c=1.

However, for greater accuracy, the present invention provides a calibration procedure which takes into account actual manufacturing variations in the physical parameters. This involves making measurements of I and O at known distances and calculating in controller 102 the calibration constants from the results of those measurements.

To perform the calculation, the equation for x is inverted as follows:

$$x=(cI+O)/[aI+bO]$$

$$(xI)a+(xO)b-Ic=0.$$

To determine the three unknown calibration constants, three different measurements of I and O are made at three known distances. The results of the three different measurements and the distances are designated as $I_1$, $O_1$, $x_1$, $I_2$, $O_2$, $X_2$, $I_3$, $O_3$, $x_3$. Therefore, $$(x_1 I_1)a+(x_1 O_1)b-I_1 c=O_1.$$

$$(x_2 I_2)a+(x_2 O_2)b-I_2 c=O_2.$$

$$(x_3 I_3)a+(x_3 O_3)b-I_3 c=O_3.$$

These equations are solved using Cramer's rule and substitution. For three equations with three unknowns, x, y, and z, we solve for z, and then substitute:

(1) $Ax+By+Cz=D;$ (2) $Ex+Fy+Gz=H;$ (3) $Ix+Jy+Kz=L;$ $z=[AFL+BHI+DEJ-AHJ-BEL-DFI]/[AFK+BGI+CEJ-AGJ-BEK-CFI];$ $y=[(CE-AG)z+(AH-DE)]/[AF-BE];$ and $x=[-By-Cz+D]/A.$ With x=a, y=b, z=c, $A=x_1 I_1$, $B=x_1 O_1$, $C=-I_1$, $D=O_1$, etc., then:

$$\begin{aligned} c &= [-x_1 I_1 O_2 x_3 O_3 - x_1 O_1 x_2 I_2 O_3 - O_1 x_2 O_2 x_3 I_3 + \quad (5) \\ &\quad x_1 I_1 x_2 O_2 O_3 + x_1 O_1 O_2 x_3 L_3 + O_1 x_2 I_2 x_3 O_3]/ \\ &\quad [-x_1 I_1 x_2 O_2 I_3 - x_1 O_1 L_2 x_3 L_3 - I_1 x_2 I_2 x_3 O_3 + \\ &\quad x_1 I_1 I_2 x_3 O_3 + x_1 O_1 x_2 I_2 I_3 + I_1 x_2 O_2 x_3 I_3]; \end{aligned}$$

$$b = [(-I_1 x_2 I_2 + x_1 I_1 I_2)c + (-O_1 x_2 I_2 + x_1 I_1 O_2)]/ \quad (6)$$
$$[(x_1 I_1 x_2 O_2 - x_1 O_1 x_2 I_2)];$$

and $$a = [-x_1 O_1 b + I_1 c + O_1]/x_1 I_1. \quad (7)$$

Further, where amplifiers having very low input impedances are not used, the calibration constants can be adjusted to accommodate for inaccurate measurement caused by "compression" of the PSD sensing area. More specifically, when the reflected IR light spot falls on the edge of the PSD, a distance of L should be measured. Instead, a deviation in the calculated position from the true position of the light spot will be encountered, where the deviation is zero in the center, and linear as the spot moves from the center to edge of the PSD. This deviation is attributable to a frequency dependent impedance at the input amplifiers. For example, if the nominal resistance across the PSD is 50 KΩ, and the additional impedance at each input amplifier at 10 Khz is 5 KΩ, the "effective" distance across the PSD is compressed by the ratio of the resistance across the PSD to the total resistance between the amplifiers: 50 kΩ/60 kΩ=0.833.

To compensate for this effect, the distance x is calculated in terms of an adjusted formula for y (position on the PSD). The equation for y had previously been calculated as y=LO/(cI+O). Adjusting this equation to account for the added input impedance at the amplifiers results in:

$$y=(L/R_P)[(R_P O+R_A (O-cI))/(O+cI)],$$

where Rp is the resistance across the PSD and $R_A$ is the input impedance at each amplifier. Recalculating for x results in:

$$\begin{aligned}
x &= fs/y' = fs/(q+y) = \\
&\quad fs/[q + (L/R_p)[(R_pO + R_A(O-cI))/(O+cI)]]. \\
&= 1/[q/fs + (L/fsR_p)[(R_pO + R_A(O-cI))/(O+cI)]]. \\
&= (O+cI)/[(q/fs)(O+cI(+ (L/fsR_pO + R_A(O-cI))]. \\
&= (O+cI)/[(cq/fs - cLR_A/fsR_p)I + ((q/fs) + \\
&\quad L/fs) + (LR_A/fsR_p))O].
\end{aligned} \qquad (8)$$

As before:

$$x=(O+cI)/(a'I+b'O),$$

where $$a'=((cq/fs)-(cLR_A/fsR_P));$$

$$b'=((q/fs)+(L/fs)+(LR_A /fsR_P));$$

$$c'=c.$$

The formal solution of the set of constants from measured values of O and I at three different known distances is the same as that described above:

$$\begin{aligned}
c &= [-x_1I_1O_2x_3O_3 - x_1O_1x_2I_2O_3 - O_1x_2O_2x_3I_3 + \\
&\quad x_1I_1x_2O_2O_3 + x_1O_1O_2x_3I_3 + O_1x_2I_2x_3O_3]/ \\
&\quad [-x_1I_1x_2O_2I_3 - x_1O_1I_2x_3I_3 - I_1x_2I_2x_3O_3 + \\
&\quad x_1I_1I_2x_3O_3 + x_1O_1x_2I_2I_3 + I_1x_2O_2x_3I_3]. \\
b' &= [(-I_1x_2I_2 + x_1I_1I_2)c + (-)_1x_2I_2 + x_1I_1O_2)]/ \\
&\quad [(x_1I_1x_2O_2 - x_1O_1x_2I_2)]. \\
a' &= [-x_1O_1b' + I_1c + O_1]/x_1I_1.
\end{aligned}$$

where $x_1$, $x_2$, $x_3$ are the known distances, and $O_1$, $I_1$, etc., are the corresponding measured signals at the outside and inside terminals of the PSD.

Alternatively, nominal values for a', b', and c can be calculated using nominal values of the physical parameters, for example, such as the following:

q=0 mm.; c=1; L=6 mm.; f=13.34 mm.; s=1.4 in (35.66 mm.); RP=50 KΩ; and RA=5 kΩ.

Since it is desired to express the distance away in inches, the value of s is in inches. From the definition of the calibration constants:

$$a'=((cq/fs)-(cLRA/fsRP));$$

$$b'=((q/fs)+(L/fs)+(LRA/fsRP));$$

$$c=c;$$

then:

a'=−0.0321;

b'=0.3534;

c=1.

For explanation of the derivation of the adjustments required to take the compression effect into account, the inside edge of the PSD is chosen as the origin and the outside O as the positive direction. This position is designated as y.

Abbreviations y=distance of spot from inside edge of PSD.
O=signal from outside terminal.
I=signal from inside terminal.
$R_i$=resistance from light spot to inside edge of PSD.
$R_o$=resistance from light spot to outside edge of PSD.
$R_A$=impedance of (single) input amplifier.
$R_p$=resistance across the PSD.
V=voltage at light spot (edges assumed to be ground).

As is clear from the above analysis, when the amplifier impedance $R_A$ is zero and other parameters have their respective nominal values, than from equation (1):

$$y=LO/(I+O)$$

When $R_A$ is not zero, the correct expression is determined by the following analysis.

The resistance from the light spot to the edge is linearly proportional to the distance to the edge, and current is inversely proportional to resistance. The resistivity (resistance per millimeter) is $R_p/L$. The total resistance from the light spot to the input amplifiers and the associated currents are given by the expressions:

$$R_i=V/I=R_A+yR_p/L.$$

$$R_o=V/O=R_A+(R_p/L)(L-y).$$

Uniform resistivity and identical input impedance are assumed for both amplifiers, and values for all the elements in these expressions are known except for the voltage, V, (dependent on the intensity of the light), and the distance, y, which are the values which need to be calculated. V can be cancelled by taking the ratio of $R_i$ to $R_o$:

$$R_i/R_o=(V/I)/(V/O)=O/I;$$

$$(R_A+yR_p/L)/(R_A+(R_p/L)(L-y))=O/I. \qquad (9)$$

Thus, solving equation (9) for y provides the correct and complete expression for y which accounts for "compression" of the PSD sensing area as:

$$y=L[OR_p+(O-I)R_A)/(R_p(I+O))] \qquad (10)$$

In further accordance with the present invention, alternative arrangements are shown in FIGS. 3 and 4 for achieving known distances $X_1$, $X_2$, and $X_3$ during calculation of the calibration constants as described above. More specifically, after assembly of the optical distance measuring system 100 has been completed, the system 100 is placed in a fixture 202 of calibration machine 200 or 208. As shown in FIG. 3, a target 204 is sequentially moved down a rail mechanism 206 into three different positions of fixed distance from the fixture/measuring system. Alternatively shown in FIG. 4, three individual targets 210(a), (b), and (c) are sequentially swung into the incident distancing light beam path. With either arrangement 200 or 208, precise values for $X_1$, $X_2$, and $X_3$ can be achieved.

Therefore, the present invention provides both an accurate and economical system for electronically calibrating an optical distance measuring system, and a method/process for generating the desired calibration constants. The present invention is particularly suited for use with any system where optical distance sensing/measuring is employed, such as, an autofocus camera system, or an optical occupant position sensing system used in conjunction with a vehicle crash discrimination system.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A calibratable optical distance measuring system comprising:

an optical transmitter for directing a distancing light beam at an object separated a particular distance from said transmitter;

an optical receiver comprising a means for imaging onto a sensing means the distancing light beam after scattering by the object, said sensing means generating an output which is indicative of the particular distance between the object and said transmitter; and a processor means responsive to said sensing means output for generating a system an output representative of the measured distance between the object and the transmitter, said processor means comprising a memory for storing a plurality of calibration constants comprising a first, second and third constant, wherein said first constant is based on a receiver amplifier gain ratio, said second constant is based on the first constant and a first set of interpositional distances of said receiver and transmitter, and said third constant is based on a second set of interpositional distances of said receiver and transmitter, and wherein said processor means combines said sensing means output with said plurality of calibration constants to generate said system output.

2. The system of claim 1 wherein said sensing means comprises a position sensitive detector which produces a first and second electrical current output responsive to a light beam being imaged onto an active sensor area, the amount of electrical current respectively output on said first and second outputs being dependent on the position of the imaged light beam in the active sensor area, wherein said processor uses said first and second outputs and a triangulation theory to generate the system output, and said plurality of calibration constants comprise predetermined values specifically generated to compensate for misalignment between said optical transmitter and receiver.

3. The system of claim 2 comprising a set of physical design parameters defined as follows:

$x$—distance of the object from said transmitter;

$L$—length of the active sensor area of the position sensitive detector;

$I$—current from the first electrical current output;

$O$—current from the second electrical current output;

$s$—perpendicular distance from the center of the distancing light beam to a principal point of a receiver lens;

$f$—distance between the principal point of the receiver lens and the position sensitive detector as measured parallel to the distancing light beam; and $q$—distance from a first edge of the active sensor area to a point where a line through the principal point of the receiver lens and parallel to the distancing light beam intersects the plane of the position sensitive detector; and said plurality of calibration constants comprises three constants, a, b, and c defined as follows:

$a = (qc)/(rs)$, $b = (q+L)/(fs)$, and $c = $ (an amplifier gain from the second electrical current output)/(an amplifier gain from the first electrical current output);

wherein $x = (cI+O)/(aI+bO)$.

4. The system of claim 3 wherein said processor means includes a means for determining said calibration constants, a, b, and c during manufacture of said system by utilizing distance measurements generated for an object at different, known distances x.

5. The system of claim 4 wherein said plurality of distance measurements comprises three different measurements $X_1$, $X_2$, and $X_3$ producing corresponding readings $I_1$ and $O$, $I_2$ and $O_2$, and $I_3$ and $O_3$, and said calibration constants are determined by:

$$\begin{aligned}
c &= [-x_1 I_1 O_2 x_3 O_3 - x_1 O_1 x_2 I_2 O_3 - O_1 x_2 O_2 x_3 I_3 + \\
&\quad x_1 I_1 x_2 O_2 O_3 + x_1 O_1 O_2 x_3 L_3 + O_1 x_2 I_2 x_3 O_3]/ \\
&\quad [-x_1 I_1 x_2 O_2 I_3 - x_1 O_1 L_2 x_3 L_3 - I_1 x_2 I_2 x_3 O_3 + \\
&\quad x_1 I_1 I_2 x_3 O_3 + x_1 O_1 x_2 I_2 I_3 + I_1 x_2 O_2 x_3 I_3]; \\
b &= [(-I_1 x_2 I_2 + x_1 I_1 I_2)c + (-O_1 x_2 I_2 + x_1 I_1 O_2)]/ \\
&\quad [(x_1 I_1 x_2 O_2 - x_1 O_1 x_2 I_2)]; \text{ and} \\
a &= [-x_1 O_1 b + I_1 c + O_1]/x_1 I_1.
\end{aligned}$$

6. The system of claim 3 wherein said calibration constants a, b, and c are generated using predetermined values for q, L, f, s, and amplifier gain.

* * * * *

UNITED STATES PATENT AND TRADEMARK OFFICE
CERTIFICATE OF CORRECTION

PATENT NO. : 5,530,548
DATED : June 25, 1996
INVENTOR(S) : James A. Campbell, et. al.

It is certified that error appears in the above-indentified patent and that said Letters Patent is hereby corrected as shown below:

```
Col. 7, line 1,  after "fs/y' =fs/(q+y) ="  delete "(8)".
Col. 7, line 6,  after "L/fs)+(LR_A/fsR_p))O]."
                 insert --(8)--.
Col. 7, line 20  after first "c" delete "'".

Claim 1,
Col. 9, line 21, after "a system" delete "an".
(SEE Examiners Amendment Dated 02/06/96)
Claim 3,
Col. 10, line 17, after "a=(qc)/" delete "(rs)"
                  insert --(fs)--.
```

Signed and Sealed this

Twenty-ninth Day of July, 1997

Attest:

BRUCE LEHMAN

*Attesting Officer*  *Commissioner of Patents and Trademarks*